United States Patent
Fujisaki et al.

(10) Patent No.: US 7,460,774 B2
(45) Date of Patent: Dec. 2, 2008

(54) METHOD TO CONTROL IMAGE STABILIZER

(75) Inventors: Takayuki Fujisaki, Saitama Pref. (JP); Asuka Yamada, Saitama Pref. (JP)

(73) Assignees: Optoelectronics Co., Ltd., Saitama Pref. (JP); Opticon, Inc., Orangeburg, NY (US)

( * ) Notice: Subject to any disclaimer, the term of this patent is extended or adjusted under 35 U.S.C. 154(b) by 183 days.

(21) Appl. No.: 11/471,820

(22) Filed: Jun. 21, 2006

(65) Prior Publication Data

US 2007/0297779 A1 Dec. 27, 2007

(51) Int. Cl.
 *G03B 17/00* (2006.01)
 *G05B 19/40* (2006.01)
 *H04N 5/228* (2006.01)
(52) U.S. Cl. .......................... 396/52; 396/55; 318/685; 348/208.99
(58) Field of Classification Search .............. 396/52–55; 318/685, 696, 604; 348/208.99; 700/69; 352/53
See application file for complete search history.

(56) References Cited

U.S. PATENT DOCUMENTS

| | | | |
|---|---|---|---|
| 4,245,298 A * | 1/1981 | Slater | 700/69 |
| 6,838,853 B2 * | 1/2005 | Matsunaga et al. | 318/685 |
| 7,129,671 B2 * | 10/2006 | Fukamizu et al. | 318/685 |
| 7,208,905 B2 * | 4/2007 | Shibatani | 318/696 |
| 7,352,150 B2 * | 4/2008 | Fujinaka et al. | 318/685 |
| 2005/0248662 A1 * | 11/2005 | Yamazaki | 348/208.99 |

OTHER PUBLICATIONS

Int'l Search Report & Written Opin. for International Application No. PCT/US07/71650.

* cited by examiner

*Primary Examiner*—Melissa J Koval
(74) *Attorney, Agent, or Firm*—Kaplan Gilman & Pergament LLP

(57) ABSTRACT

A stepper motor is controlled by a driver having a constant and maximum frequency input in order to correct for camera shake. The need for variable frequency devices is eliminated, thereby reducing the cost and complexity of the system.

11 Claims, 2 Drawing Sheets

METHOD TO CONTROL IMAGE STABILIZER

TECHNICAL FIELD

This invention relates to imaging systems, and more specifically, to an improved method for controlling an image stabilizer in a digital image capture system.

BACKGROUND OF THE INVENTION

Imaging systems can create blurry or unreadable images if the camera system shakes while the image is being captured. This is particularly problematic in digital symbol reading systems, where it is important to correctly capture a digital image containing data to be decoded. An example of such systems are those used to read 2-dimensional bar codes.

Many systems have long existed for attempting to correct this problem. These systems typically compensate by moving a detection array, such as a charge coupled device (CCD) in response to movements of the camera system. Other prior systems move the camera lens in response to shaking to compensate for movement of the camera.

A typical prior art such compensation system is shown in FIG. 1. In operation, if the camera shakes, summer 108 will output a signal representing the rate of change of the camera position with respect to time. Integrator 109 then generates a signal X representing the change in position of the camera. This signal X controls a compensator 110, which in turn is fed back through amplifier 101 for control of variable frequency ("V/F") converter 102.

That output frequency of V/F converter 102 is fed to driver 103 which controls the stepping motor 104 in a manner that is proportional to the frequency output by V/F converter 103. The stepping motor 104 then controls camera module 105, which includes an image sensor and a gyroscope sensor 107 as shown. The signal from stepping motor 104 moves the image sensor to correct for the camera shake. Thus, due to the feedback loop shown, the greater the amplitude of the camera shake, the greater the correction will be.

While the above system provides reasonable performance, one problem with it is that the V/F converter is a relatively expensive and complicated component to manufacture and control. Accordingly, the system is more costly than it needs to be, and is also subject to failures. The output frequency must track an input error signal relatively accurately.

In view of the above, there exists a need in the art for a more efficient and simpler design to compensate for camera shake in a digital imaging system.

DETAILED DESCRIPTION OF THE PREFERRED EMBODIMENT

Figure 1:
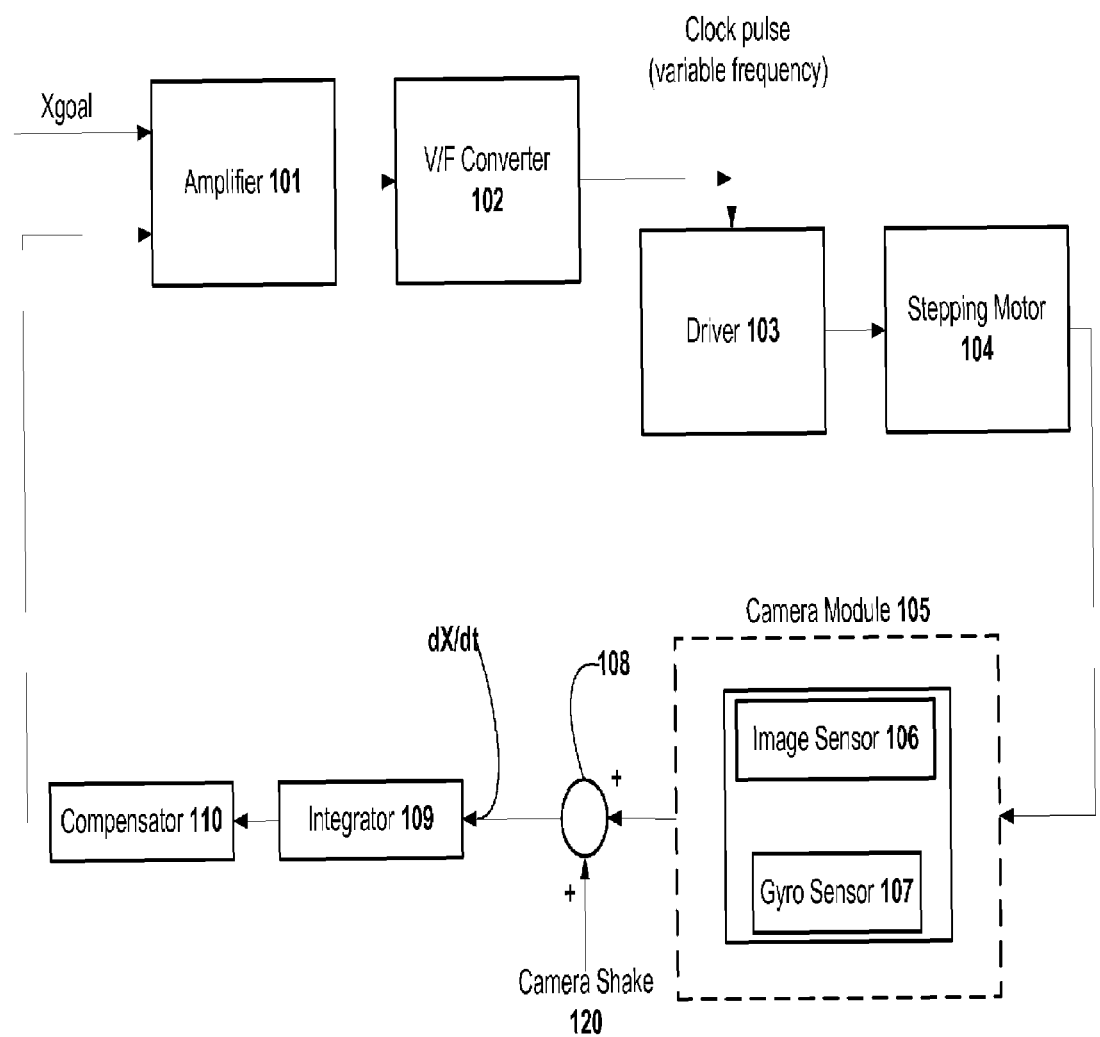
FIG. 1 depicts a prior art camera shake compensation circuit.
Figure 2:
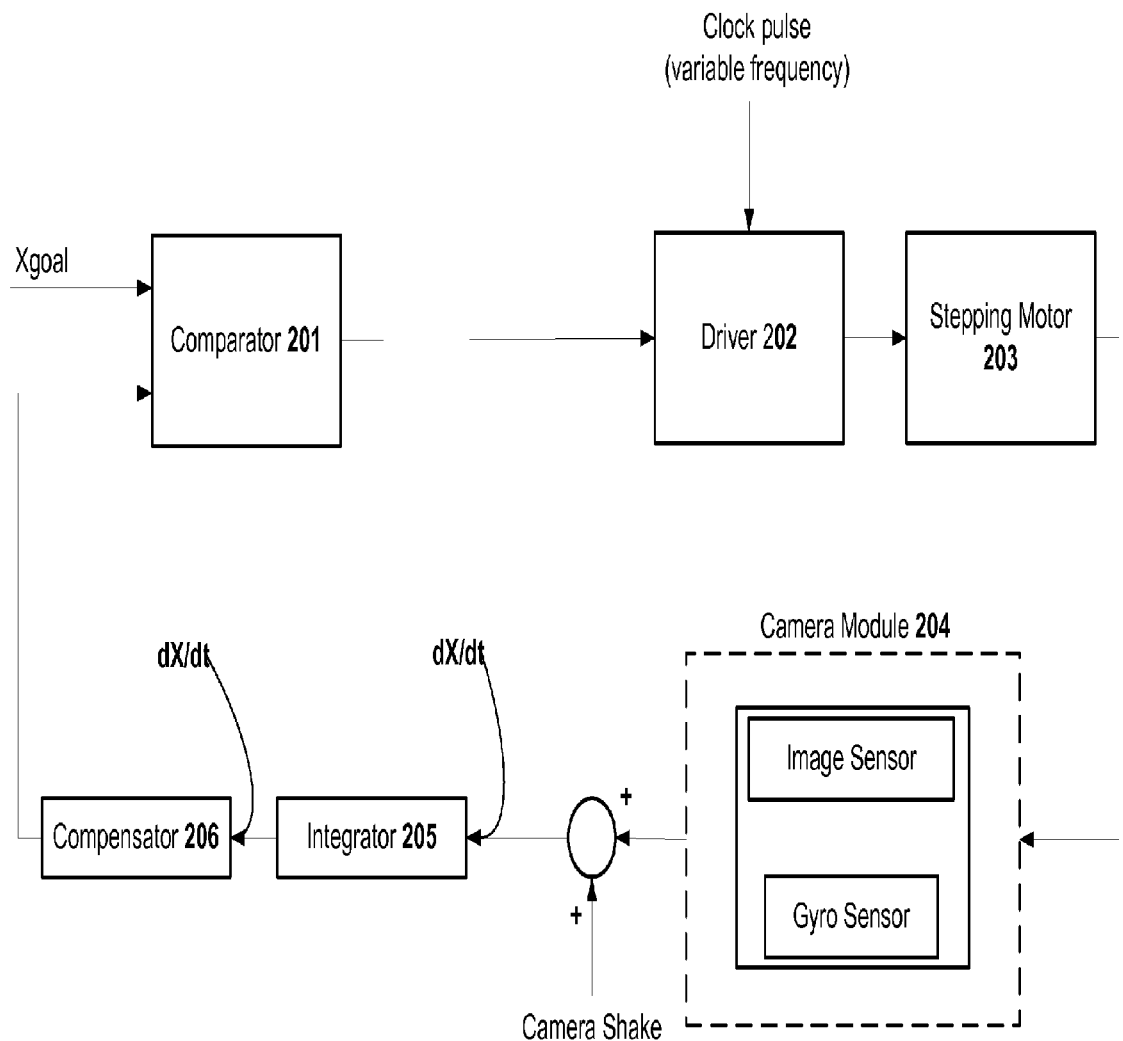
FIG. 2 shows an exemplary embodiment of the present invention.

FIG. 2 depicts an exemplary embodiment of the present invention comprising a driver 202, which is driven by a constant and predetermined maximum frequency. An exemplary value of such a frequency in a typical system would be 2 kHz. The stepping motor 203 operates at a constant speed, but the driver 202 can change the direction of the stepping motor 203 based upon the input to the driver 202. In operation, and similar to prior arrangements, the degree of camera shake is determined by integrator 205 and compensator 206. However, rather than utilizing a variable frequency device, such as in prior systems, the comparator 201 simply puts out a plus or minus which causes driver 201 to move stepping motor 203 at predetermined amounts in the selected direction. Of course, the driver can also cause the stepping motor to remain stationary during any one or more clock cycles.

Since the maximum frequency is used at driver 202, the output of driver 202 is sufficient to move the stepping motor 203 quickly enough to compensate for camera shake. In short, the input to stepping motor 203 does not vary in value, but instead may only be one of three values, either a fixed positive value, a fixed negative value or 0. The fixed positive and negative values are preferably the same value with opposite signs, but may also have different magnitudes.

As a result of the foregoing, the need for the variable frequency converter 102 of the prior art may be eliminated, and the operation of the device simplified.

It is noted that while the gyro sensor and other components are shown as examples, the invention is not limited by such examples. The stepping motor may be replaced with other position control mechanisms and/or motors, and each of the integrator and compensator may be implemented in either hardware or in software. Additionally, while it is preferred that the clock pulse for driver 202 be set at the frequency required to implement the fastest practical correction for camera shake, the clock pulse may be set at a slightly lower frequency. Also, the comparison measurements may be taken every clock cycle, or every Nth clock cycle, where N is an integer greater than 1.

It is also noted that while the foregoing explanation is with respect to correction of camera shake in one dimension, there are actually three dimensions which need correction. Accordingly, the same configuration of stepping motors and drivers can be independently implemented in three different dimensions, and readily combined to correct for total camera shake. This also allows the frequency and fixed amount of movement for the stepper motors to be different in different directions. Additionally, the stepper motor may correct for shake by moving one or more of the camera module, a Charge Coupled Device (CCD) or similar device within the camera module, or a lens. Further, the amount of movement and frequencies utilized for the driver 202 may be different for each dimension of camera shake. Also, the prior art variable frequency generator can be used for correction in one dimension, while the fixed frequency device described above can be used for correction in another direction, although such an embodiment is less preferred.

Additionally, the lens, the CCD, or the entire camera module may be moved in response to the output of comparator 201.

These and other variations are intended to be covered by the following claims.

The invention claimed is:

1. A method of compensating for camera shake comprising controlling a stepper motor with a driver responsive to a comparator generating an output signal having a magnitude and sign, said driver being controlled by the comparator and a fixed frequency clock pulse the driver so as to move the stepper motor in one of two directions if the sign is positive and in the opposite direction if the sign is negative, and by a predetermined amount during a clock cycle, regardless of magnitude.

2. The method of claim 1 further comprising utilizing an integrator in order to ascertain a position to which said camera has moved as a result of camera shake.

3. The method of 2 wherein the integrator is implemented in software.

4. The method of claim 2 wherein the integrator is implemented in hardware.

5. The method of claim 4 wherein at least two stepper motors are used to compensate for camera shake in at least two dimensions.

6. The method of claim 1 wherein the fixed amount in each direction is different.

7. The method of claim 5 wherein the fixed amount in each direction is different.

8. Apparatus for correcting for camera shake in a symbol capture device, said apparatus comprising a comparator for comparing present camera position to a desired camera position, and generating an output signal having a magnitude and sign which, in response to said comparison, causes a stepper motor to be either moved in a first direction if said sign is positive, moved in an opposite direction if said sign is negative, or by a predetermined amount during a clock cycle, regardless of said magnitude.

9. The apparatus of claim 8, duplicated for at least two dimensions, such that effects of camera shake are corrected in two different dimensions.

10. The apparatus claim 9 wherein the stepper motor causes a charge coupled device to move.

11. The apparatus of claim 10 wherein the stepper motor causes an entire camera module to move.

\* \* \* \* \*